United States Patent
Schmit et al.

(10) Patent No.: US 10,953,503 B2
(45) Date of Patent: Mar. 23, 2021

(54) VEHICLE BODY PART RACK WITH LATERAL SUPPORTS ABLE TO ROTATE THE VEHICLE BODY PART

(71) Applicant: Compagnie Plastic Omnium, Lyons (FR)

(72) Inventors: Patrick Schmit, Greer, SC (US); Tony Rapien, Piedmont, SC (US)

(73) Assignee: Compagnie Plastic Omnium, Lyons (FR)

( * ) Notice: Subject to any disclaimer, the term of this patent is extended or adjusted under 35 U.S.C. 154(b) by 130 days.

(21) Appl. No.: 16/153,217

(22) Filed: Oct. 5, 2018

(65) Prior Publication Data

US 2020/0108478 A1    Apr. 9, 2020

(51) Int. Cl.
*B23Q 3/00* (2006.01)
*B62D 65/00* (2006.01)

(52) U.S. Cl.
CPC .............. *B23Q 3/005* (2013.01); *B62D 65/00* (2013.01)

(58) Field of Classification Search
CPC ....... B25B 11/00; B25B 11/005; B25B 27/14; B23Q 3/005; B62D 65/00
USPC ............... 269/21, 25, 254 CS, 266; 108/56.3
See application file for complete search history.

(56) References Cited

U.S. PATENT DOCUMENTS

| | | | | |
|---|---|---|---|---|
| 6,298,896 | B1 * | 10/2001 | Sherrill | B29C 43/56 156/581 |
| 6,775,904 | B1 * | 8/2004 | Duebel | H05K 13/0069 269/266 |
| 7,448,606 | B1 * | 11/2008 | Johnson | B05B 13/0285 269/16 |
| 7,484,464 | B2 * | 2/2009 | Shen | B23Q 3/062 108/51.11 |
| 7,975,997 | B2 * | 7/2011 | Shimai | H01L 21/68742 118/500 |
| 10,179,357 | B2 * | 1/2019 | Ito | B21D 11/02 |
| 2005/0269757 | A1 | 12/2005 | Stevenson et al. | |
| 2013/0062823 | A1 * | 3/2013 | Boyd | B25H 1/06 269/17 |
| 2014/0259663 | A1 | 9/2014 | Scelsi et al. | |

FOREIGN PATENT DOCUMENTS

| | | |
|---|---|---|
| CN | 207189608 U | 4/2018 |
| DE | 202016106417 U1 | 2/2018 |
| JP | H03189096 A | 8/1991 |
| WO | 2007085049 A1 | 8/2007 |

OTHER PUBLICATIONS

European Search Report & Written Opinion for Application No. 19201070.0; dated Feb. 20, 2020, 4 pages.

* cited by examiner

*Primary Examiner* — Lee D Wilson
(74) *Attorney, Agent, or Firm* — St. Onge Steward Johnston & Reens, LLC

(57) ABSTRACT

A vehicle body part rack, being used for placing a vehicle body part during assembly or post-treatment of the vehicle body part. The rack includes a base plate and vehicle body part supports arranged on the base plate. Each support has a head, and a supporting rod connected to the head and the base plate. The supporting rod is movable with respect to the base plate and the rack has lateral supports which are able to hold the vehicle body part and to rotate it.

21 Claims, 2 Drawing Sheets

VEHICLE BODY PART RACK WITH LATERAL SUPPORTS ABLE TO ROTATE THE VEHICLE BODY PART

FIELD OF THE INVENTION

The invention relates to the fields of vehicle body parts racks and vehicle body parts assembly stations.

BACKGROUND OF THE INVENTION

Vehicle body parts, such as bumpers, car roof, tailgate, fenders and wheel covers, etc., must be handled very carefully to avoid any damages during the assembly process. These parts, which are visible by the user from the outside of the vehicle must remain intact after being assembled.

During the assembly, multiple kinds of operation are made on the vehicle parts, such as screwing or gluing the part with another one, drilling or assembling some elements with it. During these operations, the vehicle part must be supported to help the operator. The supporting device has to be adapted to support the part in a manner that it does not move when the operator works on it. Also, the supporting device must be able to support all along the surface of the part, so that the part does not bend when it is submitted to a localized stress. Moreover, the elements of the supporting device touching the vehicle part must be able to support it without leaving marks on it.

It is known to use vehicle body part racks to support the parts during assembling operation. Usually these racks are made for one specific vehicle body part, and for one specific position of the body part. For instance, it is used to support one model of bumper in one position. If operations have to be carried on each side of the part, two racks must be used, one for each required position of the body part. Also, it is necessary to use adapted racks for each model of vehicle part to be assembled. As a consequence, it is expensive to build or buy such a collection of racks for every produced part.

It is also known to use a specific support comprising a plurality of rods which move upward and stop when they touch the surface of the vehicle body part. As a consequence, this type of support adapts to the shape of the vehicle body part. Moreover, the multiple rods allow to have multiple contacts on the surface of the part, to distribute the strains on the part on all of its surface. A drawback of this device is that the operator has to remove the part form the support, to turn it manually and to reinstall the part on the support when he wants to work on the other side of the part. During this operation of turning the part around, the operator can by inadvertence knock the part on the environment of the support, which would leave a mark on it. Moreover, this step during the process takes time and generates tiredness for the operator.

SUMMARY OF THE INVENTION

The invention aims to overcome these disadvantages by providing a supporting device which is adaptable to all kind of vehicle body parts and can avoid the step of manually turning the part around when the operator has to process operations on the other side of the part.

Thus, the invention relates to a vehicle body part rack, being used for placing a vehicle body part during assembly or post-treatment of said vehicle body part, comprising a base plate and a plurality of vehicle body part supports arranged on the base plate, each said vehicle body part supports comprising a supporting head, and a supporting rod connected to the supporting head and the base plate, the supporting rod being movable with respect to the base plate; characterized in that the rack comprises lateral supports able to hold the vehicle body part and to rotate it.

The multiple rods, by moving upwardly from the base plate and in direction of the body part, which is maintained by its lateral ends, moves also the supporting heads which contact a surface of the vehicle body part facing the base plate. When the head touches the part, the rod stops its upward movement. With the plurality of supporting heads in contact with the vehicle body part, the strains applied to the part by the operations done on it are distributed on all the part, decreasing the risks of damaging it.

Also, the lateral supports, which hold the part by its lateral ends can turn it when the supporting heads are not in contact with it. So, when the operator finishes all the tasks he has to do on one surface of the part, the supporting heads move downward to stop supporting the part. Then, the lateral supports turn the part so that the other side of the part faces the base plate. The rods then move again upwardly in direction of the part, and their movement stops when the supporting heads touch the part and support it. In this manner, the rotation of the part is guided, avoiding the risks of knocking the part on the ground or on the vehicle body part rack when rotating it or when placing it on the rack.

Also, the step of rotation of the part can be done faster than if it was not guided.

Finally, this rotation of the part allows limiting the efforts done by the operator, thus enhancing the ergonomics on the workstation.

The vehicle body part rack according to the invention can also comprise, alone or in combination, any one of the following characteristics:
the lateral supports hold the vehicle body part by its lateral ends;
the supporting head of at least one support is able to rotate around an end of the supporting rod of this support;
the supporting head and the supporting rod of at least one support are linked by a universal joint;
the supporting head is able to rotate around an end of the supporting rod in an auto-adaptative manner, when it touches the vehicle body part;
the at least one support comprises at least one spring linking its supporting head to its supporting rod;
the spring is able to act as a damper;
the spring allows the supporting head to go back in an initial position when it does not touch the body part;
the supporting heads are made partially in a material able to deform in order to cushion the vehicle body part;
the supporting heads are made partially of a soft material;
a movement of the supporting rods is actioned pneumatically;
the air pressure actioning pneumatically the movement of the supporting rods is comprised between 0.2 and 0.7 bar, preferably 0.5 bar;
the vehicle body part rack comprises a locking mechanism able to lock the movement of the supporting rods when the supporting heads are in contact with the vehicle body part.

The invention also comprises a vehicle body parts assembly station comprising the vehicle body parts rack according to the invention.

BRIEF DESCRIPTION OF THE DRAWINGS

The invention will be clearly understood and its advantages will appear on reading the detailed description below, of an embodiment represented as a non-limiting example. The description refers to the attached drawings, on which.

DETAILED DESCRIPTION OF THE INVENTION

Figure 1:
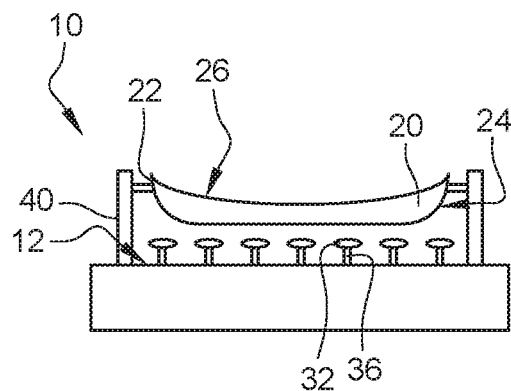
FIG. 1 is a side view showing a vehicle body part rack according to the invention and a vehicle body part held on it during a step of the assembly of the part.

FIG. 1 shows a side view of a vehicle body part rack 10 according to the invention with a vehicle body part 20 held on it.

This vehicle body part rack 10 comprises a base plate 12 which is part of a frame of the rack 10. By frame of the rack, we mean a structural part of it. The vehicle body part rack comprises a plurality of vehicle body part supports 30. Each support 30 comprises a supporting rod 36 and a supporting head 32 which is connected to the supporting rod 36. The supporting rod 36 is preferably tubular. The connection between the supporting rods 36 and the supporting heads 32 is a mechanical connection, which means that the head 32 is able to move and/or rotate with respect to the rod 36 in an auto-adaptive manner. The supports 30 are in FIG. 1 in a low position wherein the supporting heads 32 are close to the base plate 12.

FIG. 1 is a side view of the body part rack 10 so only one row of the supports 30 appear on this figure. In this example, the base plate is rectangular and supports 30 are distributed on all of its surface, for example arranged in lines or in a checkerboard pattern. It is also possible to have any kind of pattern needed for the distribution of the supports 30.

In this particular embodiment, the supporting heads 32 have the shape of a pad, a circle, a discus or disks. These shapes are an advantage to adapt to the part 20 being held.

In this position, the heads 32 are oriented in a manner in which the discus extends in a plan which is parallel to the base plate 12.

The supporting rods 36 are movable with respect to the base plate 12. In this case, they are movable in a vertical direction. As a consequence, the supporting heads 32 are able to go up and down with respect to the base plate, thanks to their link with the supporting rods 36. In other words, the supporting heads are able to move closer or to move away from a vehicle body part 20.

The vehicle body part rack 10 comprise lateral supports 40 which are able to hold the vehicle body part 20. In this case, the lateral supports 40 extend from the base plate 12.

Figure 2:
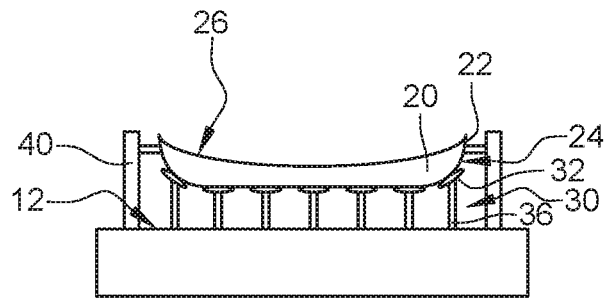
FIG. 2 is a side view of a vehicle body part rack according to the invention and a vehicle body part held on it during another step of the assembly of the part.

FIG. 2 presents the vehicle body part rack 10 with the vehicle body part supports 30 in a high position. In this position, the supporting heads 32 touch a first surface 24 of the vehicle body part 20. In this position, the first surface 24 of the body part 20 is a lower surface of it. Because of the multiple contact points between the supporting heads 32 and the first surface 24, the strains applied on the body part 20 are spread out on all the first surface 24 of the body part 20.

In this position, an operator is able to make operations on the side of the part 20 which is not in contact with the body part supports 30. Because the part 20 is supported on his first surface 24 by multiple contact points, the strains applied on the body part 20 by the operator are distributed on all the part 20, and not in only a few contact points.

The heads 32 are able to rotate so that the heads 32 face the surface 24 of the body part 20. As a consequence, the heads 32 of the supports 30 which are located on a left side and on a right side of the base plate 12 are rotated to face rounded parts of the body part 20. Advantageously, the heads 32 are not controlled by an actuator but the heads 32 are self-adaptative and will rotate only thanks to the first contact point with the part until the heads 32 reach a maximum surface contact with the surface 24 of the body part 20.

The lateral supports 40 are able to move with respect to the base plate 12. In this example they are able to move in a vertical direction. The movement of the lateral supports 40 is made in order to move the body part 20 away from base plate 12.

Figure 4:
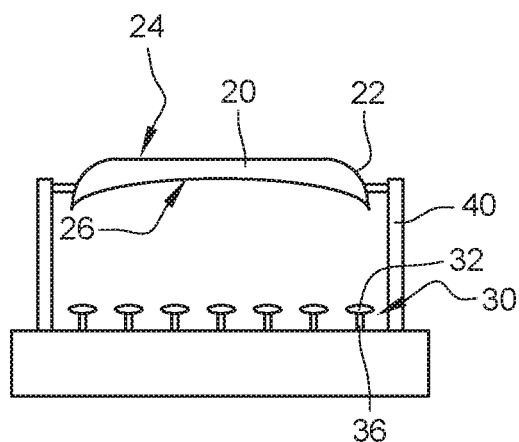
FIG. 4 is a side view of a vehicle body part rack according to the invention and a vehicle body part held on it during another step of the assembly of the part.
Figure 5:
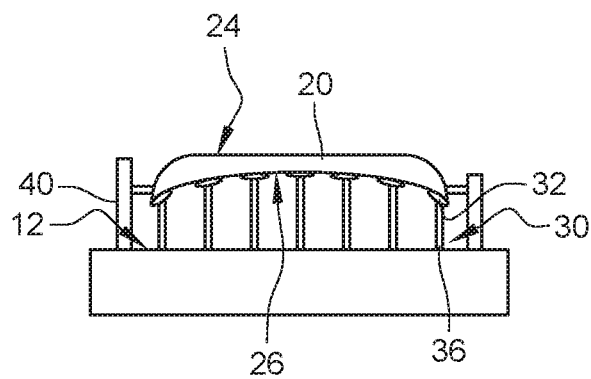
FIG. 5 is a side view of a vehicle body part rack according to the invention and a vehicle body part held on it during another step of the assembly of the part.
Figure 6:
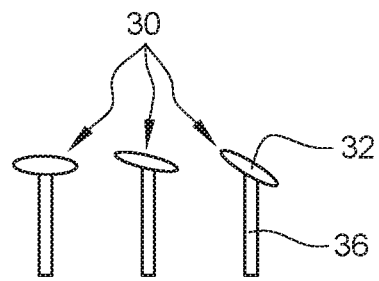
FIG. 6 is a side view of vehicle body part supports of the vehicle body part rack according to the invention.

The lateral supports 40 are able to rotate the body part 20, so that the first surface does not face the base plate 12 anymore, as shown on FIG. 4. Thanks to this rotation, a second surface 26 of the vehicle body part 20 faces the base plate 12, and can be supported by the supports 30 like the first surface 24 was supported on FIG. 2. This step is shown on FIG. 5.

The rotation of the body part 20 done by the lateral supports 40 enables the rack 10 to be used to support the same body part 20 on multiple surface of it. Indeed, is it possible to make some operations on the first surface 24 when the part is supported by its second surface 26. Because this rotation is guided by the lateral supports 40, it allows avoiding the risks of knocking the part 20 on the ground or on the vehicle body part rack 10 when rotating it or when placing it on the rack 10.

Preferably, the body part 20 is manually rotated by the operator by turning a trunnion wheel (not shown on the figures) of the lateral supports 40. This operation is done with minimal effort and is ergonomically easier than grabbing the part 20 to rotate it outside of the rack 10.

In another embodiment the rotation of the part 20 is made automatically thanks to an automation of the lateral supports 40. This operation is also done with minimal effort and is ergonomically easier than grabbing the part 20 to rotate it outside of the rack 10.

In this particular embodiment, the lateral supports 40 hold the vehicle body part 20 by its lateral ends 22. This characteristic is convenient because it facilitates the rotation of the body part 20, especially with a part which is elongated between its lateral ends 22. Also, with the supports 30 being in contact with the part 20 between its lateral ends 22, the part is particularly well hold.

It is also conceivable to have lateral supports 40 which holds the vehicle body part 20 by other parts of it.

In this particular embodiment, the supporting heads 32 of the supports 30 are able to rotate around the end of the supporting rod 36. As a consequence, the head 32 of a support 30 turns to face the vehicle body part 20. So, the supporting heads 32 adapt to the surface of the body part 10, in order to have a good distribution of the strains in the body part 20. As mentioned above, the heads 32 can advantageously be self-adaptative. The vehicle body part rack 10 is able to adapt to the geometry of the body part 20 which is held on it.

In some embodiments, the supporting rods 36 and the supporting heads 32 are linked by universal joints. By universal joint, we intend every mechanical linkage which allows the supporting heads 32 to rotate around three different axes with respect to the end of the supporting rods 36. This solution is convenient and allows, with the three rotations available, a good adaptation of the supporting heads to the vehicle body part 20.

Figure 3:
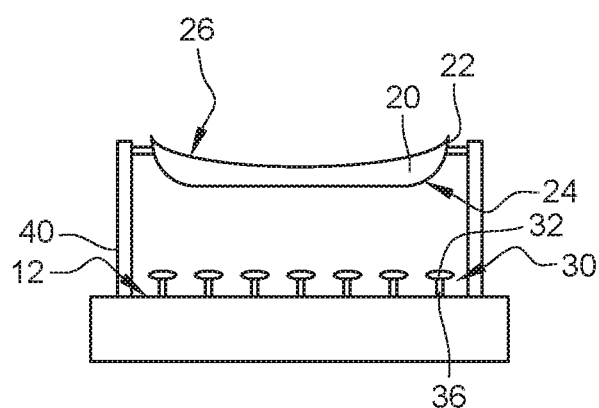
FIG. 3 is a side view of a vehicle body part rack according to the invention and a vehicle body part held on it during another step of the assembly of the part.

In some embodiments, the support 30 comprises at least one spring linking the supporting head 32 and the supporting rod 36. This spring allows the supporting head 32 to go back in its initial position after a rotation caused by the contact between the supporting head 32 and the vehicle body part 20. So, between two moments when the body part 20 is held by the supports 30 (for example as shown in FIGS. 3 and 4), there is no need to replace the supporting heads 32 to prepare it to hold again the vehicle body part 20, this is made automatically thanks to the springs.

Figure 7:
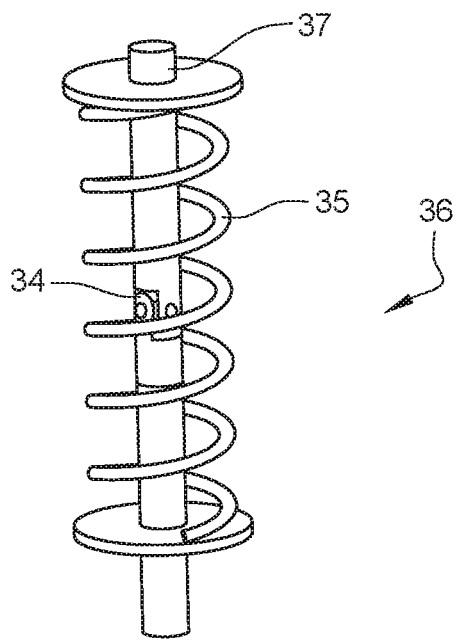
FIG. 7 is a view of an upper end of a vehicle body part support according to the invention in a straight position.
Figure 8:
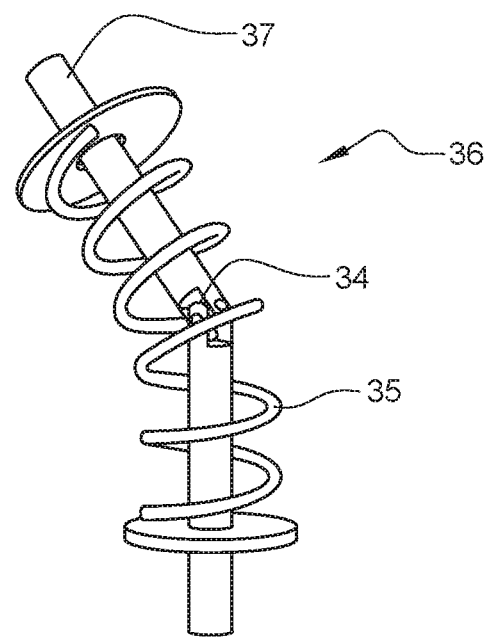
FIG. 8 is view of an upper end of a vehicle body part support according to the invention in a bended position.

This spring is shown on FIGS. 7 and 8 which present an end of a supporting rod 36 on which the supporting head 32 is fixed (the head 32 is not shown on the figure). The supporting rod 36 comprises a head 37 on which a supporting head 32 can be fixed. A universal joint 34 allows the end of the supporting rod 36 to bend in two directions. On FIG. 8 shows the position of the rod 36 when the supporting head 32 touches the vehicle body part 20. When the supporting head 32 does not touch the part 20, a spring 35 acts to put the rod 36 on a straight position shown in FIG. 7.

In some embodiments, the support 30 comprises at least another spring linking the supporting head 32 and the supporting rod 36. This spring allows the supporting head 32 and the supporting rod 36 to absorb the shock caused by the contact of the supporting head 32 with the body part 20, behaving as a damper.

Alternatively, the same spring linking the supporting head 32 and the supporting rod 36 behaves as a damper to absorb the shock and allows the supporting head 32 to go back in its initial position after a rotation. Thus, the vehicle body part support 30 comprises one or two or more springs between the supporting head 32 and the supporting rod 36.

The value of stiffness is chosen to have an effective return of the supporting heads in their initial position without the need of a too high strength applied on the heads 32 to let them rotate.

In some embodiments, the supporting heads 32 are partially made in a material able to deform in order to cushion the vehicle body part 20. A supporting head 32 comprises a rigid part which act as support and a part made in the material able to deform which cushions the vehicle body part 20. As a consequence, the supporting head 32 deforms to have a wide surface of contact with the body part 20. So, the strains are distributed in a wide surface and are reduced in the body part 20, decreasing the risk of deterioration of the body part 20. This material also permits the supporting heads 32 to contour to various body designs. Preferably, this material can be any foam, grain, rice or small polyurethane balls. Preferably, this material forms an inside part of the supporting heads 32.

In some embodiments, the supporting heads 32 are made partially in a soft material. By soft material we mean a material which does not scratch the body part 20 when it is in contact with it. Preferably, this soft material is used for the outer surface of the supporting heads 32 which is in contact with the body part 20. Preferably, this material can be a suede cloth, a cotton cloth, a rubberized material or a silicone material.

In some embodiments, the movement of the supporting rods is actioned pneumatically. This solution in the activation of this movement is particularly convenient because it allows the movement to stop when the supporting heads 32 are in contact with the body part 20 without stopping the pneumatically actioning of the supports 30, with applying a force which is predetermined by the air pressure.

Also, because they are actioned pneumatically, the supporting rods 36 act as dampers to absorb the shock caused by the contact between the supporting heads 32 and the vehicle body part 20.

It is also possible to activate this movement by other means, like with an electric engine for instance.

Preferably, the air pressure actioning pneumatically the movement of the supporting rods 36 is comprised between 0.2 and 0.7 bar, preferably 0.5 bar. This interval of pressure allows to maintain the body part 20 in a satisfying manner without applying a strength on it which would risk to deteriorate it.

In some embodiments, the vehicle body piece rack comprises a locking mechanism able to lock the movement of the supporting rods 36 when the supporting heads 32 are in contact with the body part 20. As a consequence, the supports 30 are locked in a working position when the supporting heads touch the body part 20. So, there is no movement of the supports even if an important strength is applied on the side of the part 20 which is not in contact with the supporting heads 32, when some operations (for instance screwing, . . . ) are made on the part 20.

It is also possible that the movement of the supporting rods 36 is only locked by the pneumatic pressure used to elevate the rods 36 and the contact between the supporting heads 32 and the part 20.

The invention also concerns a vehicle body parts assembly station comprising a vehicle body part rack 10 as described above.

We will now describe an example of the functioning of an embodiment of the vehicle body part rack 10, step by step, as illustrated by FIGS. 1 to 5.

First, the body part 20 is held, in this example by its lateral ends 22, by the lateral supports 40. In this step, the body part 20 is held only by the lateral supports 40. The supports 30 are in a low position in which the supporting heads 32 are close to the base plate 12. The heads 32 do not touch the body part 20.

Then, the movement of the supports 30 is activated, in the particular embodiment pneumatically. As a consequence, the supporting rods 36 rise in direction of the body part 20 and stop when the supporting heads 32 are effectively in contact with the first surface 24 of the vehicle body part 20. The heads 32 also rotate in order to fit the shape of the first surface 24 of the body part 20. The movement of the supporting rods 36 is then locked in the position shown in FIG. 2, with the heads 32 touching the first surface 24 of the body part 20. The body part 20 is now fully supported by the body part rack 10.

Then, all the necessary operations are made on the body part 20, which is safely held by the rack 10, especially all the operation implying a strength applied on the second surface 26 of the body part 20, this strength being transmitted via the body part 20 to the supporting heads 32 of the supports 30.

After these operations, the supports 30 go back in their low position and the lateral supports 40 rise in order to give the body part 20 space to turn around. This step is illustrated by FIG. 3. This rise of the lateral supports 40 is optional.

Then, the body part 20 rotates so that the second surface 26 now face the supporting heads 32 of the body part rack 10, and so that the first surface 24 is now free of access from above, as shown in FIG. 4. The lateral supports 40 now go down with the body part 20 and stop before the body part 20 touches the supporting heads 32.

Then, the supports 30 rise so that the supporting heads 32 touch the second surface 26 of the body part 20, and the rods 36 are locked in this position. This step is similar to the step described before when the supports 30 rise in order to contact the first surface 24 of the body part 20. The rack 10 is now in a working position, with the part 20 being held and the first surface 24 being free to be processed.

In this example there are only two surfaces 24, 26 of the body part 20 which are processed, but it is also possible to have three, four or more positions, with as many surfaces on the part 20 which are held by the supporting heads 32.

While the disclosure has been described with reference of an exemplary embodiment, it will be understood by those skilled in the art that various change may be made without departing from the scope of the invention.

LIST OF REFERENCES

10: vehicle body part rack
12: base plate
20: vehicle body part
22: vehicle body parts lateral end
24: first surface of the body part
26: second surface of the body part
30: vehicle body part support
32: supporting head
34: universal joint
35: spring
36: supporting rod
37: head of the supporting rod
40: lateral support

What is claimed is:

1. A vehicle body part rack, being used for placing a vehicle body part during assembly or post-treatment of said vehicle body part, comprising a base plate and a plurality of vehicle body part supports arranged on the base plate, each said vehicle body part support comprising a supporting head, and a supporting rod connected to the supporting head and the base plate, the supporting rod being movable with respect to the base plate and the rack further comprises lateral supports able to hold the vehicle body part and to rotate the vehicle body part;
wherein the supporting head of at least one of the vehicle body part supports is able to rotate around an end of the supporting rod of the supporting head's corresponding vehicle body part support;
wherein the at least one support further comprises at least one spring linking the supporting head of the at least one support to the supporting rod of the at least one support.

2. The vehicle body part rack according to claim 1 wherein the at least one spring is able to act as a damper.

3. The vehicle body part rack according to claim 1 wherein the spring allows the supporting head to go back in an initial position when the supporting head does not touch the body part.

4. A vehicle body part rack, being used for placing a vehicle body part during assembly or post-treatment of said vehicle body part, comprising a base plate and a plurality of vehicle body part supports arranged on the base plate, each said vehicle body part support comprising a supporting head, and a supporting rod connected to the supporting head and the base plate, the supporting rod being movable with respect to the base plate and the rack further comprises lateral supports able to hold the vehicle body part and to rotate the vehicle body part
wherein a movement of the supporting rods is actioned pneumatically.

5. The vehicle body part rack according to claim 4 wherein air pressure acting pneumatically to cause the movement of the supporting rods is between 0.2 and 0.7 bar.

6. The vehicle body part rack according to claim 4 wherein air pressure acting pneumatically to cause the movement of the supporting rods is 0.5 bar.

7. An assembly station comprising:
a vehicle body parts assembly station;
a vehicle body parts rack for placing a vehicle body part during assembly or post-treatment of said vehicle body part, the vehicle body parts rack located at the vehicle body parts assembly station, the vehicle body parts rack includes a base plate and a plurality of vehicle body part supports arranged on the base plate, each said vehicle body part support comprising a supporting head, and a supporting rod connected to the supporting head and the base plate, the supporting rod being movable with respect to the base plate and the rack further comprises lateral supports able to hold the vehicle body part and to rotate the vehicle body part.

8. The assembly station according to claim 7 wherein the lateral supports hold the vehicle body part by lateral ends of the vehicle body part.

9. The assembly station according to claim 7 wherein the supporting head of at least one of the vehicle body part supports is able to rotate around an end of the supporting rod of the supporting head's corresponding vehicle body part support.

10. The assembly station according to claim 9 wherein the supporting head is able to rotate around an end of the supporting rod in an automatic manner, when the supporting head touches the vehicle body part.

11. The assembly station according to claim 10 wherein the at least one support further comprises at least one spring linking the supporting head of the at least one support to the supporting rod of the at least one support.

12. The assembly station according to claim 9 wherein the at least one support further comprises at least one spring linking the supporting head of the at least one support to the supporting rod of the at least one support.

13. The assembly station according to claim 12 wherein the at least one spring is able to act as a damper.

14. The assembly station according to claim 13 wherein the spring allows the supporting head to go back in an initial position when the supporting head does not touch the body part.

15. The assembly station according to claim 14 wherein air pressure acting pneumatically to cause the movement of the supporting rods is between 0.2 and 0.7 bar.

16. The assembly station according to claim 7 wherein the supporting head and the supporting rod of at least one support are linked by a universal joint.

17. The assembly station according to claim 16 wherein the at least one support further comprises at least one spring linking the supporting head of the at least one support to the supporting rod of the at least one support.

18. The assembly station according to claim 16 wherein the supporting head is able to rotate around an end of the supporting rod in an automatic manner, when the supporting head touches the vehicle body part.

19. The assembly station according to claim 7 wherein the supporting heads are made partially in a material able to deform in order to cushion the vehicle body part.

20. The assembly station according to claim 7 wherein the supporting heads are made partially of a soft material.

21. The assembly station according to claim 7 wherein a movement of the supporting rods is actioned pneumatically.

\* \* \* \* \*

UNITED STATES PATENT AND TRADEMARK OFFICE
CERTIFICATE OF CORRECTION

PATENT NO. : 10,953,503 B2  
APPLICATION NO. : 16/153217  
DATED : March 23, 2021  
INVENTOR(S) : Patrick Schmit et al.

Page 1 of 1

It is certified that error appears in the above-identified patent and that said Letters Patent is hereby corrected as shown below:

On the Title Page

Item (71), Line 1:
"Compagnie Plastic Omnium, Lyons"
Should be changed to:
-- Compagnie Plastic Omnium, Lyon --

Item (73), Line 1:
"Compagnie Plastic Omnium, Lyons"
Should be changed to:
-- Compagnie Plastic Omnium, Lyon --

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*